US005553446A

United States Patent [19]
Sibley et al.

[11] Patent Number: 5,553,446
[45] Date of Patent: Sep. 10, 1996

[54] APPARATUS FOR BALING BULK FIBROUS MATERIAL

[76] Inventors: Duane L. Sibley, H.C.R. 67 Box 169; Dwight A. Sibley, H.C.R. 67 Box 161, both of Nashua, Mont. 59248

[21] Appl. No.: 365,152

[22] Filed: Dec. 28, 1994

Related U.S. Application Data

[63] Continuation-in-part of Ser. No. 32,645, Mar. 17, 1993, Pat. No. 5,337,481.
[51] Int. Cl.$^6$ ............................ A01F 15/02; B65B 11/02; B65B 13/02
[52] U.S. Cl. .................... 56/341; 53/586; 53/590
[58] Field of Search .................... 56/341, 432; 100/3, 100/17, 18, 145; 53/389.1, 389.3, 220, 228, 586, 590

[56] References Cited

U.S. PATENT DOCUMENTS

| | | | |
|---|---|---|---|
| 3,910,005 | 10/1975 | Thimon et al. | 53/586 X |
| 4,464,889 | 8/1984 | Weelink | 56/341 |
| 4,989,397 | 2/1991 | Tomac et al. | 53/586 X |
| 5,009,062 | 4/1991 | Urich et al. | 56/341 |
| 5,020,311 | 6/1991 | Matthies | 56/432 |
| 5,203,144 | 4/1993 | Gambetti | 53/389.1 X |

*Primary Examiner*—David J. Bagnell
*Attorney, Agent, or Firm*—Harry M. Cross, Jr.

[57] ABSTRACT

The apparatus forms and wraps fibrous bulk material or the like into bales and comprises bale forming apparatus for forming the material into an elongated continuous mass and plastic film wrapping apparatus. The bale forming apparatus has a bale-forming compartment with an infeed end and a discharge end, and material flow restricting apparatus located between the infeed and discharge ends for resisting the movement of the material. The wrapping apparatus in the form of a compressed bale wrapper that applies a sheet of plastic film around each bale while maintaining the bale in a compressed form. While the bale wrapper operates on discrete bales, separated from the elongated mass produced from the bale-forming means, the bale-forming means continues to produce an uninterrupted compressed mass of material. The bale wrapping system comprises a bale transfer compartment oriented in line with the bale-forming compartment and in communication with the bale-forming compartment discharge end for receiving the compacted mass of material, and a material flow resisting apparatus for resisting the movement of the mass of material from the bale-forming compartment into the bale transfer compartment so as to maintain the mass of material in the bale transfer compartment in a state of compaction, and a plastic film wrap-applying assembly for wrapping discrete bales in a sheet of plastic film, and bale transfer means for transferring discrete bales from the bale transfer compartment into the wrap-applying assembly.

20 Claims, 11 Drawing Sheets

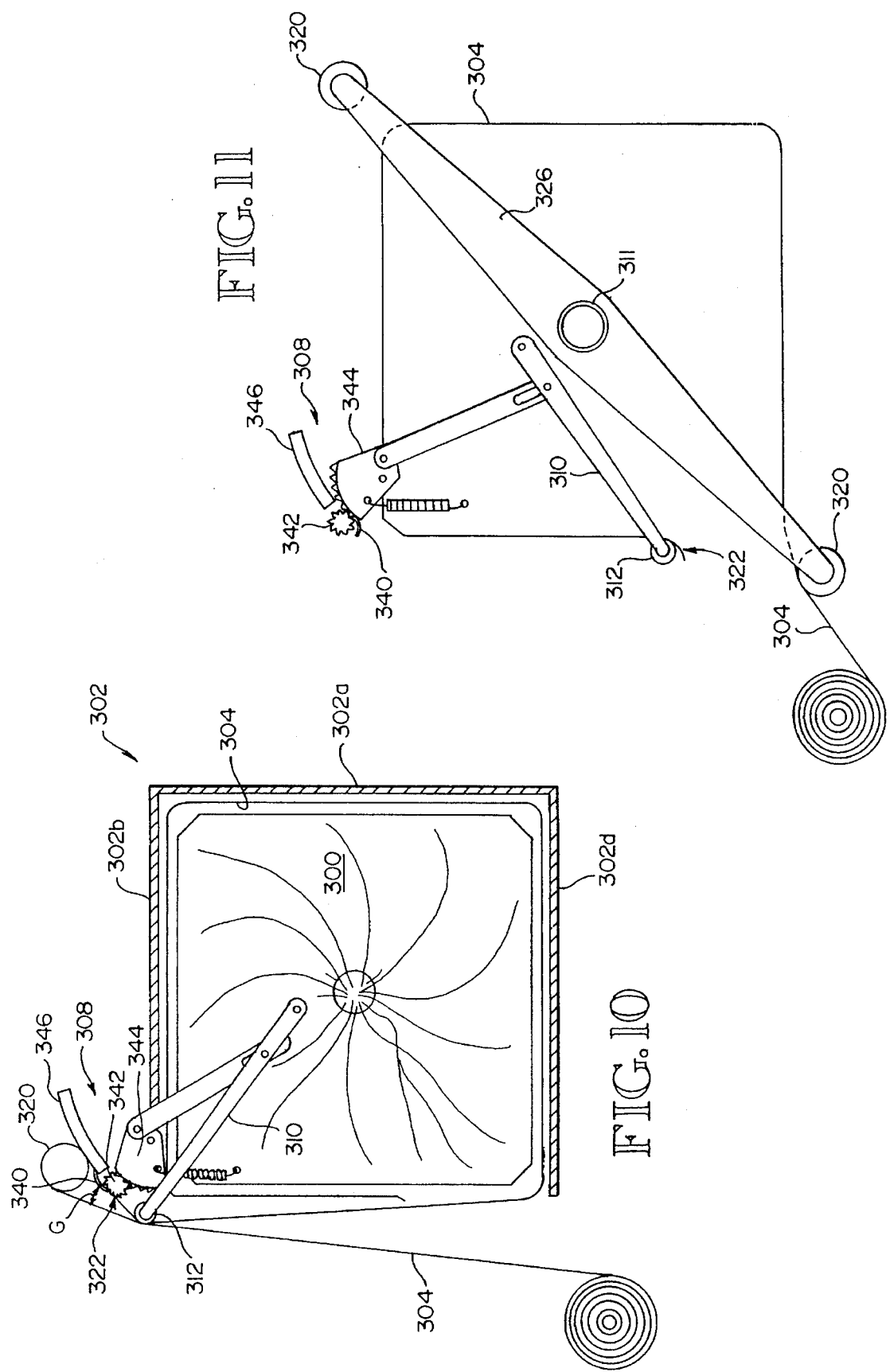

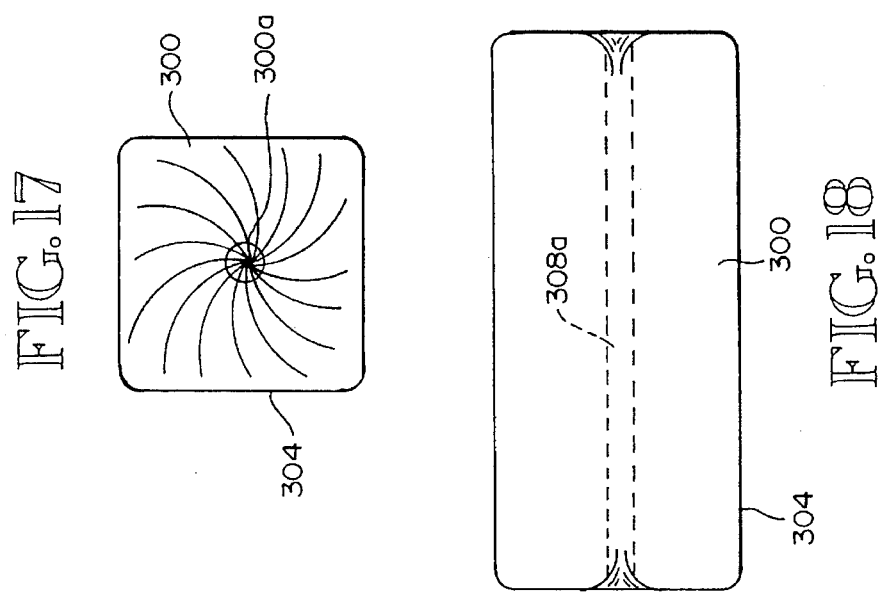
FIG. 17
FIG. 18
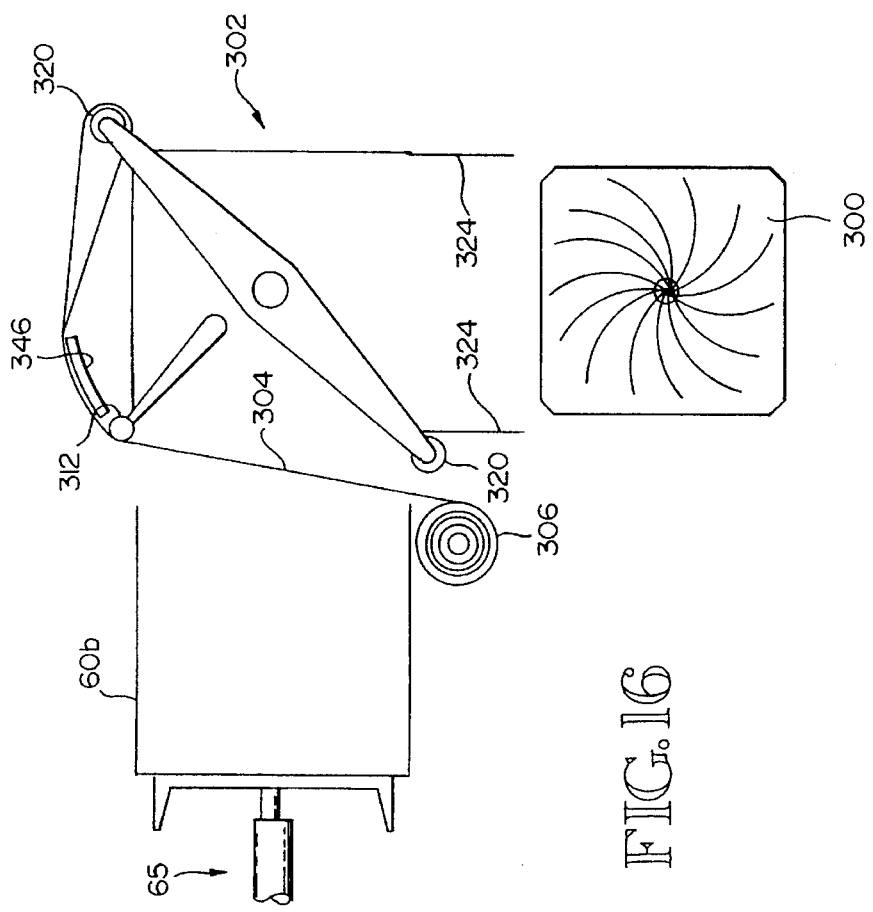
FIG. 16

APPARATUS FOR BALING BULK FIBROUS MATERIAL

RELATED APPLICATION

The application is a continuation-in-part of Ser. No. 08/032,645 filed Mar. 17, 1993, now U.S. Pat. No. 5,337,481.

1. Field of the Invention

This invention relates to apparatus for forming bulk fibrous material or the like into bales and binding them in a sheet of material such as a net or film. More particularly, this invention relates to apparatus that can be towed or driven through a field for picking up and baling bulk material into plastic-wrapped bales.

2. Background of the Invention

Fibrous material balers, such as hay and straw balers, are known for compressing fibrous material and binding the material into bales bound by twine or wire. This type of machine is commonly used on farms and ranches for baling hay, straw, and other fibrous materials. This type of machine has also been used in various industrial and commercial applications. The trend in baling machine development has been to design machines capable of producing larger and larger bales to minimize handling; it being more efficient to handle fewer larger bales as compared to handling more numerous smaller bales. Such machines have been proposed based on conventional plunger-type systems wherein fibrous material is packed by means of a plunger to produce rectangular or square bales. Such machines has also been proposed based on conventional round bale systems wherein fibrous material is rolled upon itself. In these systems, the packing and compressing of the material must be interrupted in order to bind or tie each bale. Because of the shape of round bales, they have more spoilage than square bales; trapping rain and snow when they are stacked. Also, the shape of round bales prevents compact storage. Moreover, use of such machines in agricultural settings produces bales of tightly wrapped material that cannot be easily separated or loosened when the bale is opened.

It has also been proposed to wrap bales of fibrous material by a sheet of netting or film material so as to enhance the quality of the baled material and/or to resist weather damage or rodent damage. Systems have been proposed to wrap twine-bound bales in plastic film bands or tubes, for example. Such systems, as have been heretofore proposed, have been advertised to be suitable for binding hay, either wet or dry, and silage materials. Heretofore, however, such systems have been provided as adjunct apparatus to be used in additional conventional twine or wire bale-binding apparatus. This adjunct apparatus requires additional handling of the bale to charge the plastic film-applying apparatus after the bales have been discharged from the twin or wire bale-binding apparatus.

A system purporting to provide a continuous bale-forming and bale-wrapping operation is described in U.S. Pat. No. 5,020,311 issued to Gebrueder Welger GmbH & Co. KG. However, this system wraps a cylindrical form with a helically-applied band and then severs the wrapped form into discrete, round bales, thereby producing a wrapped form with exposed ends.

Baling machines for fibrous bulk material have been proposed that employ an auger feeding mechanism to compact the material into a denser unit for binding; one of the latest being that disclosed in U.S. Pat. No. 5,009,062 issued to Oren D. Urich. Such as have been proposed have attempted to produce more compact, denser, bales than conventional plunger-type systems or round bale-type systems. Most such, however, appear to be rather complicated and employ complicated, unconventional binding mechanisms. Oftentimes, these systems employ reciprocating mechanisms to effect relative longitudinal movement between the auger feed mechanism and the binding compartment during the interval that the binding operation takes place in order for the auger feed mechanism to operate continuously. None appear to have been able to successfully supplant conventional plunger-type and round bale-type machines.

In the hay industry in particular, railcar loads of baled hay are being transported from the hay-growing regions of the country to other parts of the country. Present day hay baling machines of the conventional plunger-type do not produce bales that are both small enough to be easily loaded onto and off-loaded from railcars and dense enough to fill a railcar to its weight limit. In the typical case, a railcar is filled to its volume capacity long before its weight capacity is reached. This case results in greater transport charges per ton than need be.

The smaller farming operations do not have any present day alternatives and, therefore, do not have ready access to long distance interstate railcar shipment of baled hay; the higher per ton shipping costs mitigating against profitable shipment by railcar. For the smaller farming operations to compete successfully in this long distance railcar market, they must have hay baling equipment that is affordable and that will produce relatively small and dense bales that can be handled on the farm without employing costly auxiliary equipment. And the bales must be dense enough that a railcar's load capacity can be reached before its volumetric capacity. For many such farming operations, the physical size of a bale that is dense enough should be on the order of 2 ft.×2 ft.×4 ft. up to 4 ft.×4 ft.×8 ft; with the latter size bordering on being too large for convenient handling. Many conventional plunger-type balers produce bales that are 14 in.×18 in.×4 ft.

Furthermore, hay and silage baling equipment has not been available that would pick up field-windrowed material, form the material into discrete, highly-compacted bales, and then fully wrap the individual compacted bales in a continuous manner in one machine.

SUMMARY OF THE INVENTION

It is, accordingly, a primary object of this invention to provide a baling machine for producing, in a continuous manner, discrete, compacted bales of fibrous material, such as hay or silage materials, and wrapping the individual bales in a sheet of plastic film. It is a further object of this invention to provide such a machine wherein the bale-forming operation is continuous and wherein the bale-wrapping operation operates simultaneously with the bale-forming operation on a bale-by-bale basis. Still another object of this invention is to provide a complete field-operated machine for picking up, compacting, and baling high moisture hay and silage in plastic-wrapped discrete bales.

The apparatus of this invention forms and binds fibrous bulk material or the like into bales and comprises bale forming means for forming the material into an elongated continuous mass and bale wrapping means for receiving the mass of material in the form of discrete bales and wrapping the discrete bales in a plastic wrapping film. The bale forming means has a bale-forming compartment with an infeed end and a discharge end, and material flow restricting means located between the infeed and discharge ends for resisting the movement of the material and auger feeding means for conveying the material into the infeed end of said bale-forming compartment. An improvement of this invention comprises the provision of compacting roller means so constructed and arranged with respect to the auger feeding means whereby material is conveyed through said compacting roller means into said bale-forming compartment and compacted against the mass of material at the bale-forming compartment infeed end. The compacting roller means and the material flow restricting means cooperatively function to create the mass of material in a compacted condition with material being added to the mass of material at the bale-forming compartment infeed end and compressed thereinto by the compacting roller means. A further improvement of this invention comprises the provision of a wrapping means in the form of a compressed bale wrapper that applies a sheet of plastic film around each bale while maintaining the bale in a compressed form. While the bale wrapper operates on discrete bales, separated from the elongated mass produced from the bale-forming means, the bale-forming means continues to produce an uninterrupted compressed mass of material.

The auger feeding means comprises a longitudinal auger shaft having an infeed end and a discharge end, at least one conveyor flight mounted by the shaft between the shaft infeed and discharge ends. The compacting roller means is mounted by the auger shaft at the shaft discharge end and is so constructed and arranged with respect to the conveyor flight whereby material conveyed by the auger feeding means will pass from the conveyor flight and through the compacting roller means into the bale-forming compartment for distribution and compaction against the mass of material at the bale-forming compartment infeed end.

The bale wrapping means comprises a bale transfer compartment oriented in line with the bale-forming compartment and in communication with the bale-forming compartment discharge end for receiving the compacted mass of material, and material flow resisting means for resisting the movement of the mass of material from the bale-forming compartment into the bale transfer compartment so as to maintain the mass of material in the bale transfer compartment in a state of compaction. The bale wrapping means also comprises plastic film wrap-applying means for wrapping discrete bales in a sheet of plastic film, and bale transfer means for transferring discrete bales from the bale transfer compartment into the wrap-applying means.

A preferred embodiment of the invention includes both a bale-forming compartment and a bale-transfer compartment arranged in tandem whereby bulk material may be bound into a discrete bales while bulk material is being simultaneously formed into an elongated mass of material. Both compartments include means for resisting rearward transport of the bulk material so as to enable the bulk material to be compressed into a form suitable for baling. Discrete bales are shifted laterally from the bale-forming operation into a plastic film wrapper wherein the discrete bales are wrapped in a sheet of plastic film and then discharged from the system.

BRIEF DESCRIPTION OF THE DRAWINGS

FIG. 10 is a cross-section view of the FIG. 9 apparatus taken along the line 10—10;

FIG. 11 is an end view of the FIG. 9 apparatus taken from the point of line 11—11;

FIGS. 12–16 illustrate sequential stages of the wrapping of baled material by the apparatus of FIGS. 9–11;

FIG. 17 is a transverse cross-section view of the wrapped bale;

FIG. 18 is a longitudinal cross-section view of the wrapped bale;

DETAILED DESCRIPTION OF THE INVENTION

Figure 1:
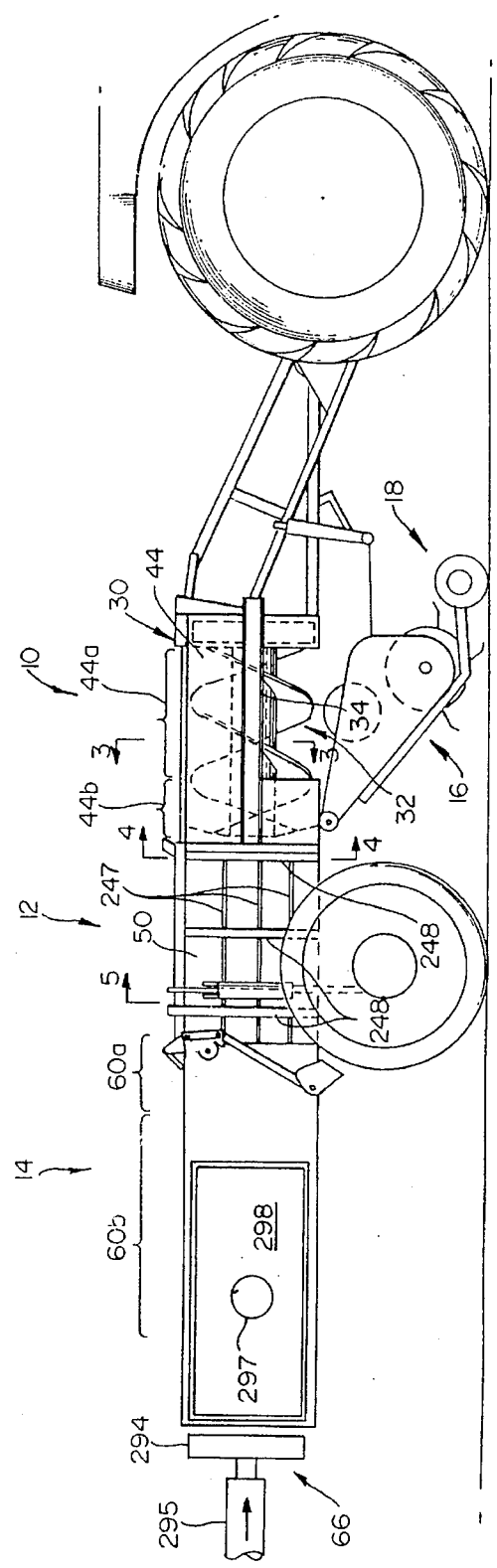
FIG. 1 is a simplified side elevation view of the baler of this invention as adapted to field baling of materials such as hay or silage materials.

The baling machine of this invention is specifically designed as a field baler to pick up windrowed crop material for baling. The baling machine of this invention is particularly suited for field baling hay and silage materials and similar kinds of bulk fibrous agricultural materials. The principles of this invention may be employed in stationary machines used for agricultural product baling or for baling of non-agricultural products.

In brief, the baling machine of this invention comprises at least a bulk material auger feeding means 10, and a bale-forming means 12 into which bulk material is transferred by the auger feeding means 10, and a bale wrapping means 14. The baling machine of this invention also preferably comprises a bulk material charging means 16. In the case of a stationary baling machine, according to this invention, the bulk material charging means 16 may be as simple as a hopper means within which bulk material may be placed into contact with the auger feeding means 10. In the case of a field baling machine for hay or silage materials or the like, however, the bulk material charging means 16 may preferably include a pick up means 18 for picking up windrowed material from the field and conveying it into a header means 20 for transfer to the auger feeding means 10.

The auger feeding means 10 comprises a rotary drive means 30 so mounted as to rotatably drive an auger 32 about the longitudinal axis of an auger shaft 34 so as to rotate a pair of spiral auger flights 36,37. At the inner end of shaft 34, opposite the drive means 30, compacting roller means 38 is provided, preferably in the form of a pair of compacting rollers 40,41 mounted on diametrically-opposed radial shafts 42,43. Roller shafts 42,43 are mounted by shaft 34 and extend radially outward therefrom. The auger flights 36,37 are so arranged with respect to the rollers 42,43 that each roller is positioned adjacent the termination of an auger flight and such that the roller surfaces extend inward beyond the termination of the auger flights so that material conveyed inward by auger flights will flow inward from the auger. Consequently, the material flowing off the inner ends of the auger flights will be contacted for compaction at a compacting surface located inward of the termination of the auger flights. The compacting rollers 40,41 are preferably conical sections so as to provide a convex compacting surface providing a progressively greater degree of compaction proceeding outward from the longitudinal axis of auger rotation.

The auger 32 is mounted by the rotary drive means 30 and extends, in cantilever fashion, through an auger housing 44. Auger housing 44 is subdivided into a bulk material infeed section 44a and a bulk material conveying section 44b. The infeed section 44a is designed to enable bulk material to be fed into an infeed compartment for engagement by the auger 32 for conveyance inward. The conveying section 44b is designed to provide a cylindrical compartment, within which the auger flights closely fit, through which the bulk material is conveyed from the infeed compartment and inward, past the compacting roller means 38, into the bale-forming means 12. To facilitate conveyance of the bulk material therethrough, the surface of the cylindrical compartment in section 44b is provided with one or more spiral ribs 46 which are of opposite hand from the auger flights. (For example, if the auger 32 rotates clockwise as viewed from the front (infeed) end of the machine, the auger flights 36,37 would be left hand and the spiral ribs 46 would be right hand).

The bale-forming means 12 provides a longitudinal bale-forming compartment 50 that immediately adjoins the conveying section 44b. Compartment 50 has a cross section that matches the desired cross section of the compacted bale that is the product of the machine; preferably a square cross section for a hay baling machine. There is no transition section between the inner end of conveying section 44b and the adjacent beginning of compartment 50. A transverse wall 52 joins the inner periphery of compartment 50 to the outer periphery of section 44b, preferably perpendicular to the longitudinal axis of auger 32. The length of auger 32 is such that its inner end, as well as the inner edges of compacting rollers 40,41 extend slightly into the bale-forming compartment 50, on the order of about 1 inch; just enough that the convex compacting surface defined by the rollers 40,41 is within the compartment 50. Compartment 50 is preferably at least 2 to 3 feet long, but its required length may vary somewhat depending on the cross section dimensions of the bale to be produced by the machine.

The bale-forming means 12, in addition to compartment 50, comprises means 54 for applying transverse compressive force to the bale being formed in compartment 50 so as to offer a resistance against unrestricted movement of the bale being formed through compartment 50. Thus, as material is being conveyed into compartment 50 and formed into a bale therein, means 54 will offer resistance to rearward movement of the bale being formed so that additional material, as it is being conveyed into the forward end of the compartment 50, will be compacted by rollers 40,41 against the forward end of the bale being formed. The extent of the compaction is dependent upon the amount of resistance to movement that is provided by means 54.

Bale wrapping means 14 provides a longitudinal transfer compartment 60 that is immediately adjacent to, and in-line with, bale forming compartment 50. Bale transfer compartment 60 has an infeed section 60a, which accepts a formed and compacted bale from bale-forming compartment 50, and a bale-holding section 60b. As bulk material continues to be fed by auger feeding means 10 into bale forming means 12, the compacted material extends in a continuous form through compartment 50 and into compartment 60 until the longitudinal extent of the compacted material within compartment 60 is the desired finished bale length. When the appropriate length of compacted material is extended into the holding section 60b of compartment 60, material dividing means 62 separates the compacted material within section 60b from the material extending from compartment 50 into the infeed section 60a of compartment 60. Then, bale wrapping means 64 is actuated to wrap the compacted material from section 60b into a discrete finished bale.

The bale wrapping means 14, in addition to compartment 60, material dividing means 62 and plastic wrap-applying means 64, comprises means 66 for applying longitudinal compressive force to the compacted bale in compartment 60 so as to offer a resistance against unrestricted movement of the compacted bale through compartment 60. Thus, as compacted material is being conveyed through compartment 60, means 66 will offer resistance to rearward movement of the compacted bale so as to maintain the bale in its compacted state in preparation for being wrapped into a discrete finished bale The extent of the compaction is dependent upon the amount of resistance to movement that is provided by means 66. The resistance means 54 for the bale forming compartment 50 and the resistance means 66 for the bale transfer compartment 60 are independent and separately adjustable.

The machine as so far described operates in the following manner once the machine is operating with a bale being formed within bale-forming compartment 50. Material to be baled is fed, more or less continuously, to the infeed section 44a of auger housing 44 and that material is transferred by auger 32 rearward through conveying section 44b into the bale forming compartment 50. As the material is transferred into the bale forming compartment 50, it passes between the compacting rollers 40,41 into compartment 50 off the inward (rearward) ends of the auger conveyor flights 36,37. The inward ends of the conveyor flights 36,37 distribute the material in a more or less spiral manner onto the forward end of the bale being formed in compartment 50. Because of the resistance to rearward movement caused by resistance means 54, the material distributed off the inner ends of conveyor flights 36,37 is contacted by the compacting rollers 40,41, thereby being rolled and compacted against the forward end of the bale that is being formed. These rollers 40,41, being mounted on the rotating auger 32, rotate with auger 32, and the surfaces of the rollers roll against the material as it leaves the rearward ends of the auger flights 36,37 to distribute it uniformly across the forward end of the bale being formed in a spiral manner. The rollers 40,41, being frusto-conical, create a convex compaction surface on the forward end of the bale within compartment 50. The rollers 40,41 lay the material onto the convex compaction surface in spiralled layers. As additional material is fed rearwardly by the conveyor auger 32, rollers 40,41 will continue to distribute and lay that material onto the convex compaction surface thereby adding to the bale as it is being formed. As the material is added to the bale and compacted by rollers 40,41, the compacting force will override the resistance means 54 and the compacted material will be translated rearwardly through compartment 50 into compartment 60.

As the compacted material's rearward end is translated rearwardly of the infeed section 60*a* of compartment 60, resistance means 66 will be engaged to maintain the compacted material from compartment 50 in a compacted state until enough compacted material is contained within the bale holding section 60*b* to make up a finished bale. Then, the material dividing means 62 is engaged to separate the compacted material within compartment 50 from the material in holding section 60*b*, bale transfer means 65 is actuated to transfer the discrete bale from section 60*b* to the plastic wrap-applying means 64, and means 64 is engaged to apply a sheet of plastic film about the compacted material.

During the short time during which bale transfer means 65 is operated, the movement of the rearward end of the compacted material within compartment 50 is halted by material dividing means 62. Because the material is compressible, however, that temporary halt of movement at the rear end of the bale being formed does not interfere with the transfer of material from auger 32 to the forward end of the bale being formed. Thus, the present invention is characterized by permitting the continuous feeding of material into the machine with no interruption as discrete bales are separated and wrapped. When the bale transfer operation is completed, the material dividing means 62 is inactivated, thereby permitting the rearward end of the bale being formed in compartment 50 to be translated rearwardly through the infeed section 60*a* of compartment 60 and into contact with means 66 so as to maintain longitudinal compressive force on forward end of the bale. Thereafter, the delivery of material to the convex compaction surface by compacting rollers 40,41 will cause the compacted material and the tied and finished bale to be translated as a unit rearwardly.

The continuing rotation of the auger-mounted rollers 40,41 effects a continuous compaction of the material as it is translated off the rearward ends of the auger flights 36,37. As a consequence, the material is uniformly compacted throughout the bale as the bale is formed. Because the compacting action of the rollers 40,41 also effects a spiral laying-in of the material during the compaction process, the resultant bale consists of a multiplicity of wafers, each of which is on the order of about 1 inch thick. This is to be contrasted with a bale resulting from a conventional plunger-type baler which will a have series of wafers that are each 4 inches or more thick. Whereas in a plunger-type baler where the material is pressed into the bale in any which direction (usually crumpled lengthwise), the compaction of material by the present invention into spiral layers tends to lay the material with the material stems (in the case of fibrous material such as hay or straw) layered in a somewhat coplaner pattern. Consequently, delicate material such as alfalfa hay can be compacted into bales by the present invention with much less leaf-stem separation and, hence, much less leaf loss.

It has been discovered that the rotary compaction of hay effected by the present invention not only keeps the individual plant's components intact, but also crushes the plant stems slightly in a direction transverse to the plant stem's longitudinal extent, thereby making the hay more palatable to livestock. Conventional baling machines do not produce this desirable effect. For example, it is common in large scale cattle feeding operations to open up numerous bales of hay and then run tractors through and across the open bales to crush the hay to make it more palatable. This approach to crushing hay bales is time consuming and wasteful inasmuch as the leafs, in the case of alfalfa hay, are separated from the hay stems. Bales produced by the present invention are opened by these same cattle feeding operations and fed "as is", without any such "physical conditioning" and with less waste because the hay is more palatable just as it come from the bale.

The auger shaft 34 may extend inward toward compartment 50 beyond the inner edges of the rollers 40, 41. By doing so, as the bulk material is compacted against the trailing end of the mass of material within compartment 50, a longitudinal, axial passage 300*a* (see FIGS. 17 and 18) will be created as the bale is being formed. This passage 300*a* can be used to tuck the ends of the plastic wrapping film as shown in FIG. 18 so as to complete the bale wrapping process.

Figure 3:
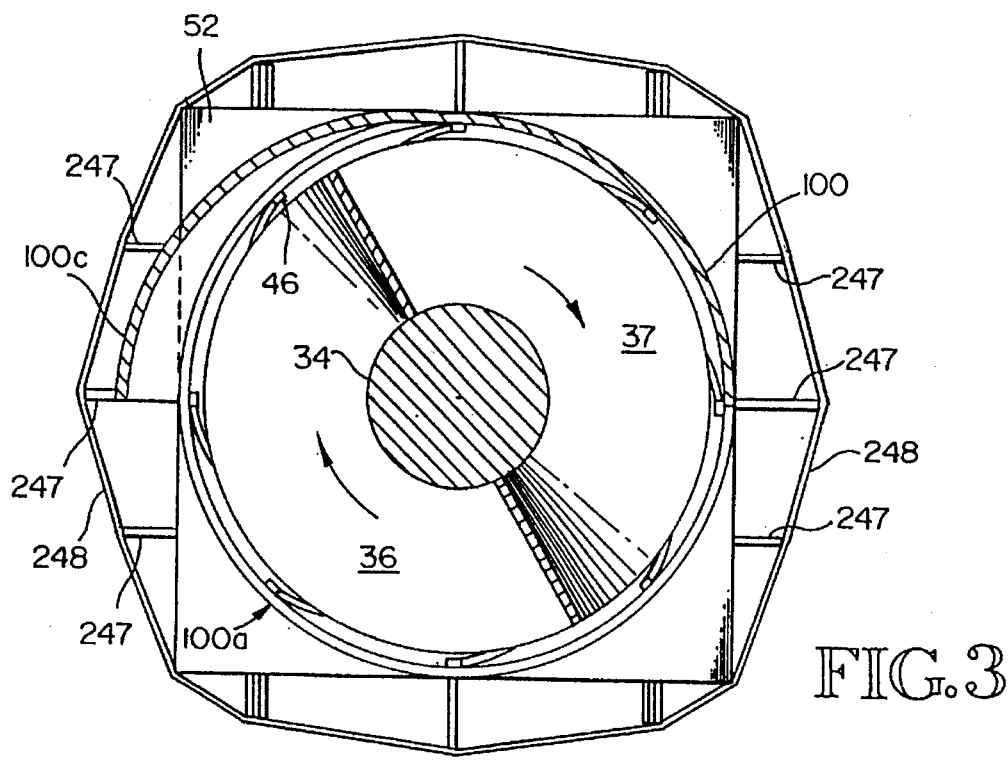
FIG. 3 is an elevation view in cross section taken along the line 3—3 of FIG. 1.
Figure 4:
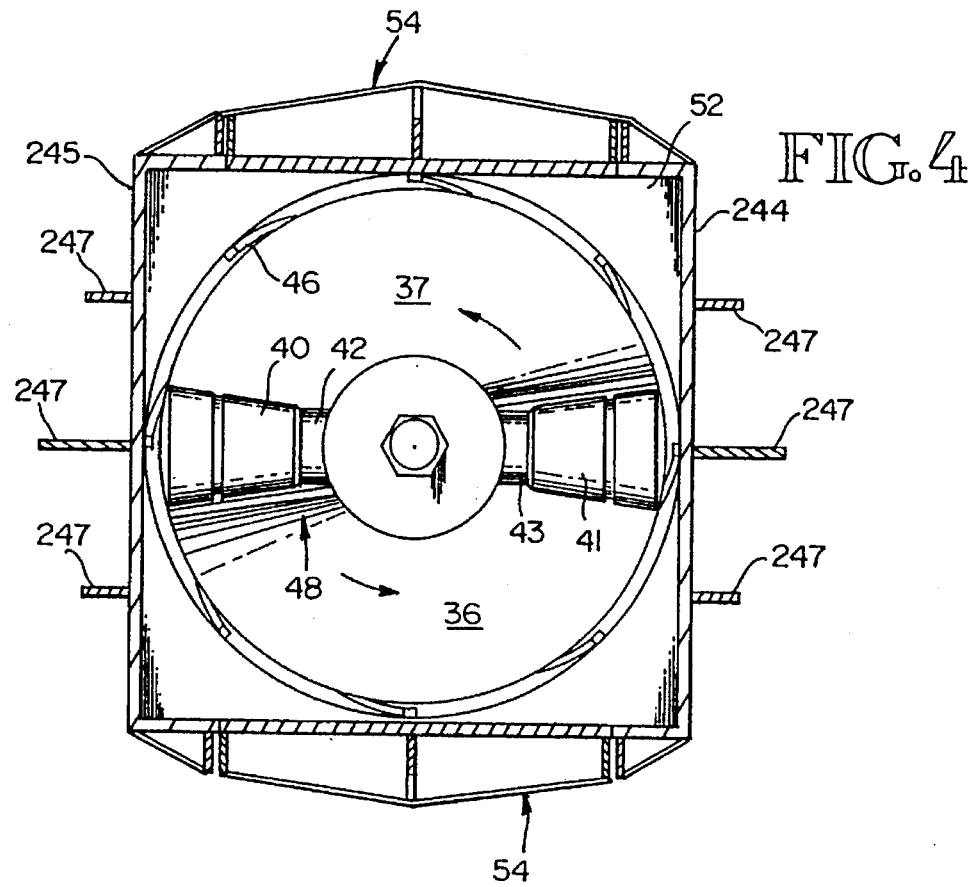
FIG. 4 is an elevation view in cross section taken along the line 4—4 of FIG. 1.
Figure 19:
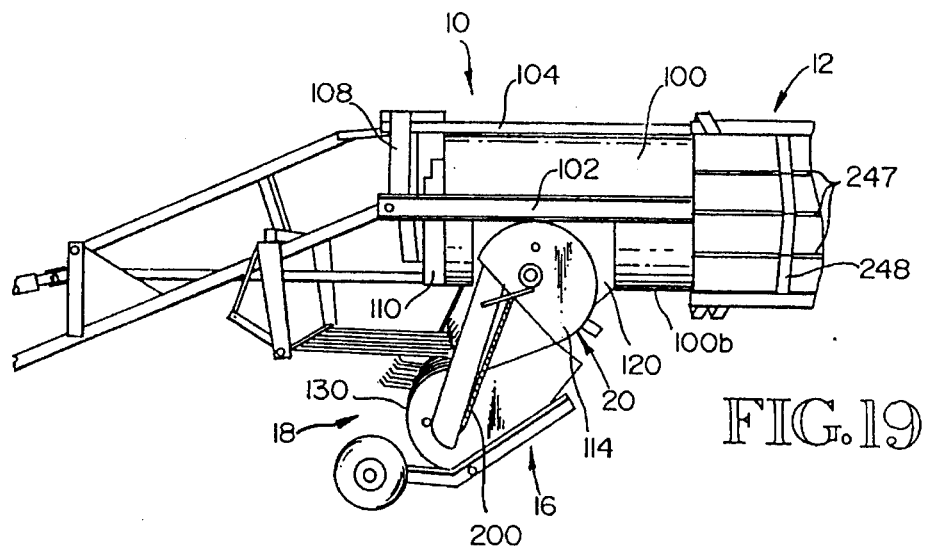
FIG. 19 is a left side view in perspective of the front end of the FIGS. 1–2 baler.
Figure 20:
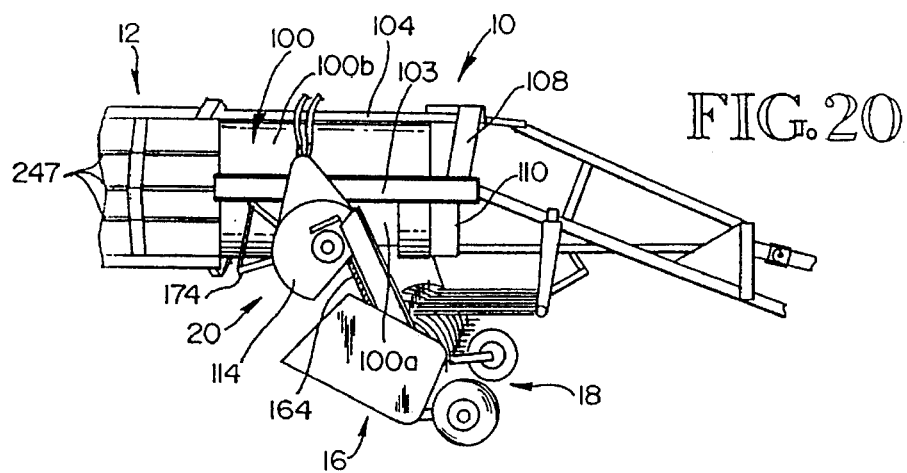
FIG. 20 is a right side view in perspective of the front end of the FIGS. 1–2 baler.
Figure 21:
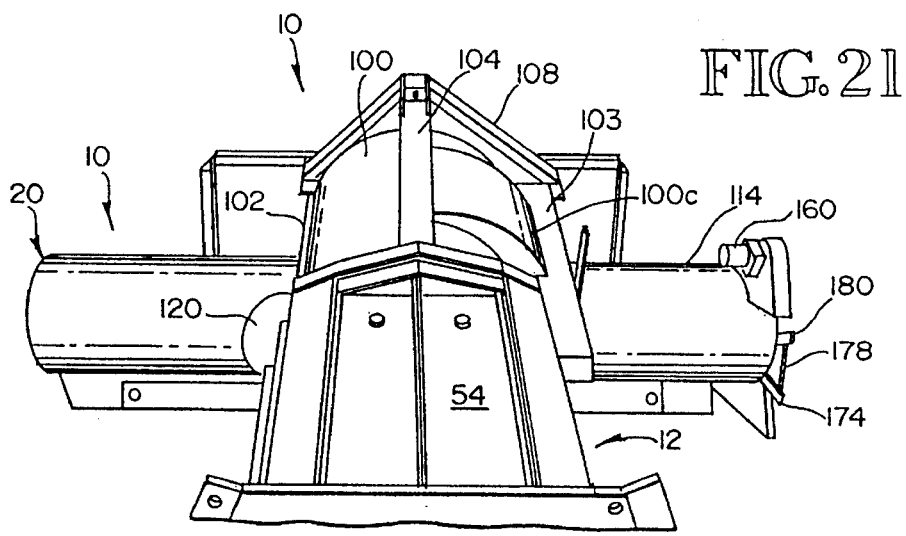
FIG. 21 is a top view in perspective of the front end of the FIGS. 1–2 baler.
Figure 22:
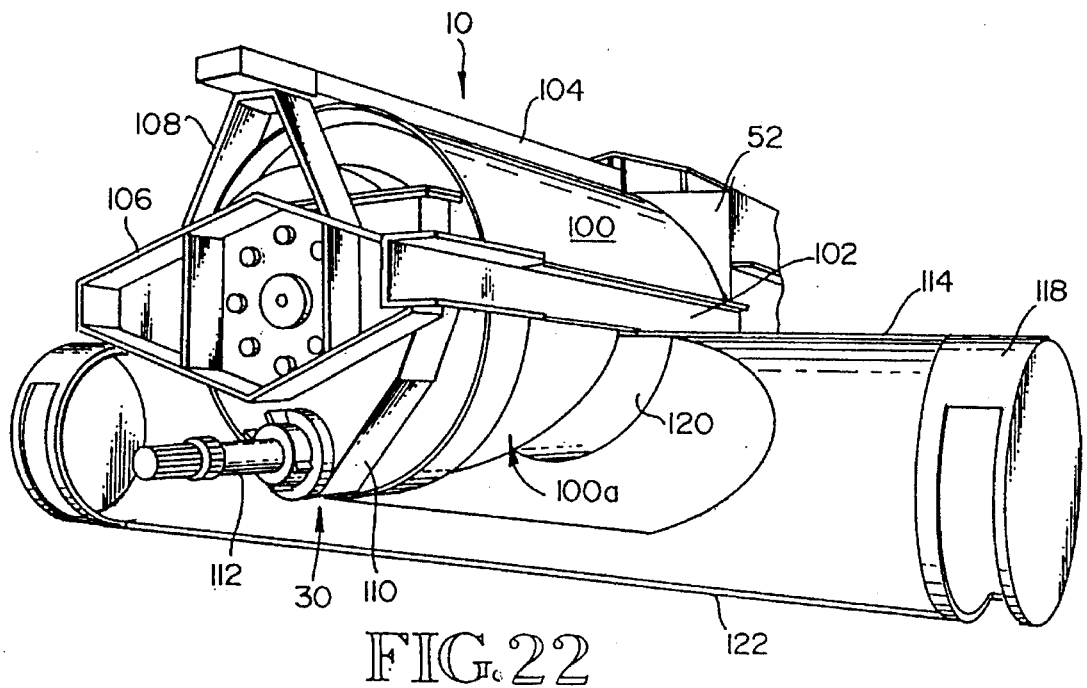
FIG. 22 is a partial view in perspective of the front end framework and superstructure of the FIGS. 1–2 baler.
Figure 23:
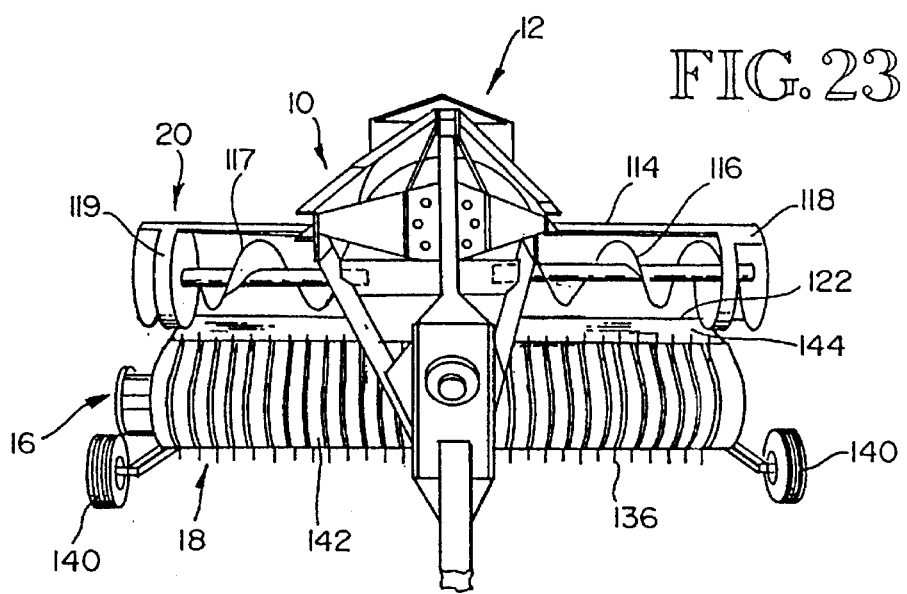
FIG. 23 is a front end view in perspective of the FIGS. 1–2 baler.

As seen in FIGS. 19–25, the auger feeding means 10 of this invention preferably comprises a cylindrical auger housing 100 that is mounted within and carried by left, right and top longitudinal reinforcing beams 102, 103, 104. The front ends of the side beams 102, 103 are rigidly joined to a front, transverse mounting block 106, and the front end of top beam 104 is rigidly jointed to mounting block 106 through an A-frame member 108. Between the front head of the auger housing 100 and mounting block 106, rotary drive means 30 is mounted. Rotary drive means 30 comprises a gear box 110 containing an appropriate gear train for rotating auger 32 at the desired speed as a result of the rotary input from drive shaft 112. The forward end of auger shaft 34 extends through the gear box 110 and is journal mounted within mounting block 106 such that the auger 32 is supported in cantilever fashion therefrom. Viewed from the front end, the auger 32 rotates clockwise. To facilitate the introduction of hay or the like into the infeed section 100*a* and pickup by the auger flights 36,37, the housing 100 is flared outward and downward in the upper left quadrant as shown at 100*c* (FIGS. 3 and 21). The lower half, or belly, of the auger housing is cutaway to provide the material infeed section 100*a,* as shown in FIGS. 3 and 22. This infeed section is immediately adjacent the gearbox 110 and extends rearwardly a sufficient length (designated 44*b* in FIG. 1) to enable the auger 32 to contact and carry the material up into the auger housing 100. The length of the auger housing conveying section (44*b* in FIG. 1 and 100*b* in FIG. 19) need only be of a length sufficient to transport the material rearwardly into the bale forming means 12. In the embodiments shown, the infeed section, 44*b* or 100*b,* is about ⅔ of the length of the auger housing and the conveying section is about ⅓ of the length of the auger housing.

As seen in FIGS. 19–25, the header means 20 of the bulk material charging means 16 comprises a cylindrical header housing 114 that is mounted to the underside of the infeed section 100a of the auger housing 100 such that housing 114 extends perpendicularly to the longitudinal axis of the baling machine. The longitudinal length of housing 114 is substantially greater than the transverse width of the main body of the baling machine. Left and right header augers 116, 117 are rotatably mounted by the left and right end mounting sections 118, 119 of housing 114 such that the augers are cantilevered toward the longitudinal center of the machine. The inner ends of the augers 116, 117 terminate within the space defined by the housing infeed section 100a. The header housing 114 is cut-away toward the front to expose the augers 116,117 to the pick up means 18. At the rear midsection 120 of the header housing 114, the header housing funnels rearwardly to provide a tapered rear transition section from the header housing 114 to the material conveying section 100b as seen in FIGS. 19, 21 and 22. The transition midsection 120 is tapered as shown in FIGS. 20 and 21 on the other side of the machine also; the orientation of the machine in FIGS. 20 and 21, for example, hides the fact that this transition midsection 120 is symmetrical about the longitudinal axis of the baling machine. The header augers 116, 117 are transversely oriented (with respect to the longitudinal extend of the baling machine) and are interconnected by a header drive means such that they rotate in unison to transversely convey bulk material inward toward and into the infeed section 100a for contact with the longitudinally-oriented feeding auger 32. The transverse axis of the header housing 114 is the rotation axis of the header augers 116, 117. This header housing axis is located at an elevation below the axis of the feeding auger 32 such that the lower edge 122 of header housing 114 extends continuously below the infeed auger housing 100 as shown in FIG. 22.

As shown in FIGS. 19–21 and 23, the pick up means 18 comprises a rotatable cylinder 130 located at the forward end of the baling machine and supported by a transverse shaft 132. Shaft 132 is rotatably mounted in a wheeled pick up carriage 134 such that cylinder 130 just clears the ground. A plurality of radially-oriented pick up fingers 136 are mounted to cylinder 130 to assist in lifting up bulk material such as hay or straw (as from a windrow) as the baling machine is towed across a field. Cylinder 130 is rotatably interconnected by header drive means with the header augers 116, 117 such that material will be lifted by the rotating pick up fingers and conveyed rearwardly into the header housing 114, across the top of cylinder 130. Once the material is within the header housing 114, header augers 116, 117 convey the material transversely inward toward and into the infeed section 110a for engagement by the feeding auger 32. The pick up carriage 134 is pivotally mounted to the header housing 114 by left and right brackets 138, 139 (FIGS. 24 and 25) so that the pick up means 18 may adjust to varying terrain as the carriage ground-engaging wheels 140 travel along the field. Pick up means 18 also includes a transversely-elongated cover 142 that encloses at least the bottom, front and top of the pick up cylinder 136 to provide a surface over which the pick upped material will slide as it is transported rearwardly into the header housing 114. Cover 142 is slotted so that the pick up fingers 136 can protrude therethrough. An apron 144 connects the rearward edge of cover 142 to the bottom edge of header housing 114 so that material transported from the pick up means 18 to the header means 20 will not fall out between the two.

Figure 24:
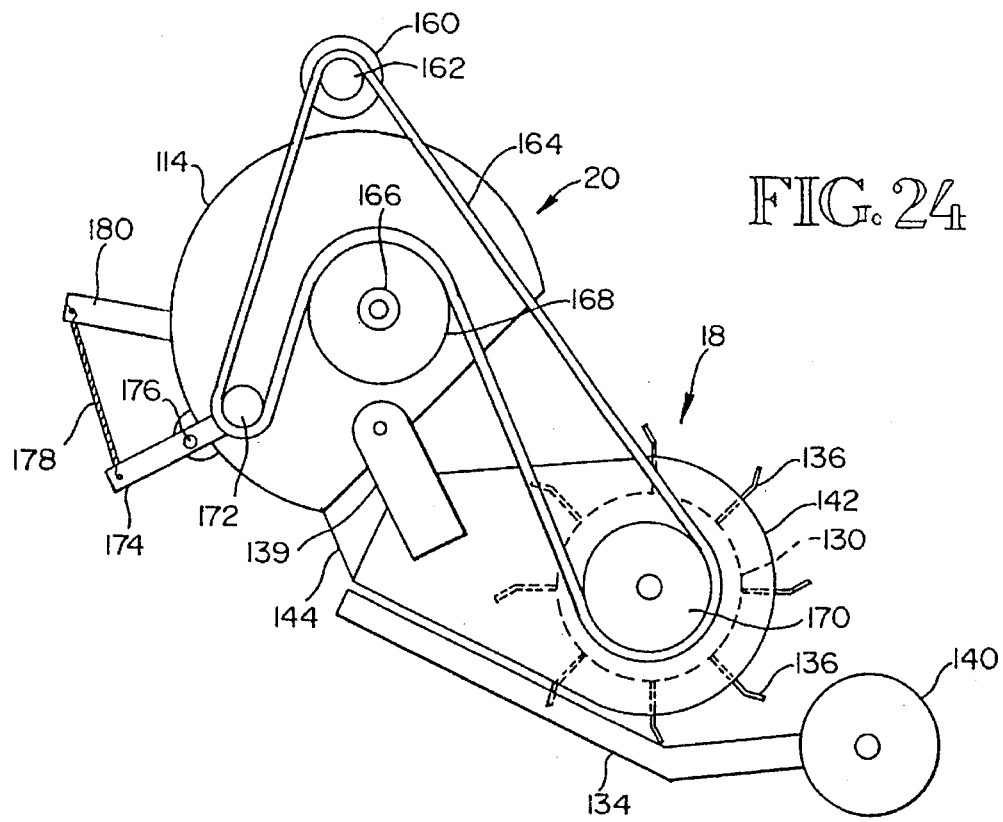
FIG. 24 is a side elevation view of the right side chain drive mechanism associated with the header assembly of the FIGS. 1–2 baler.
Figure 25:
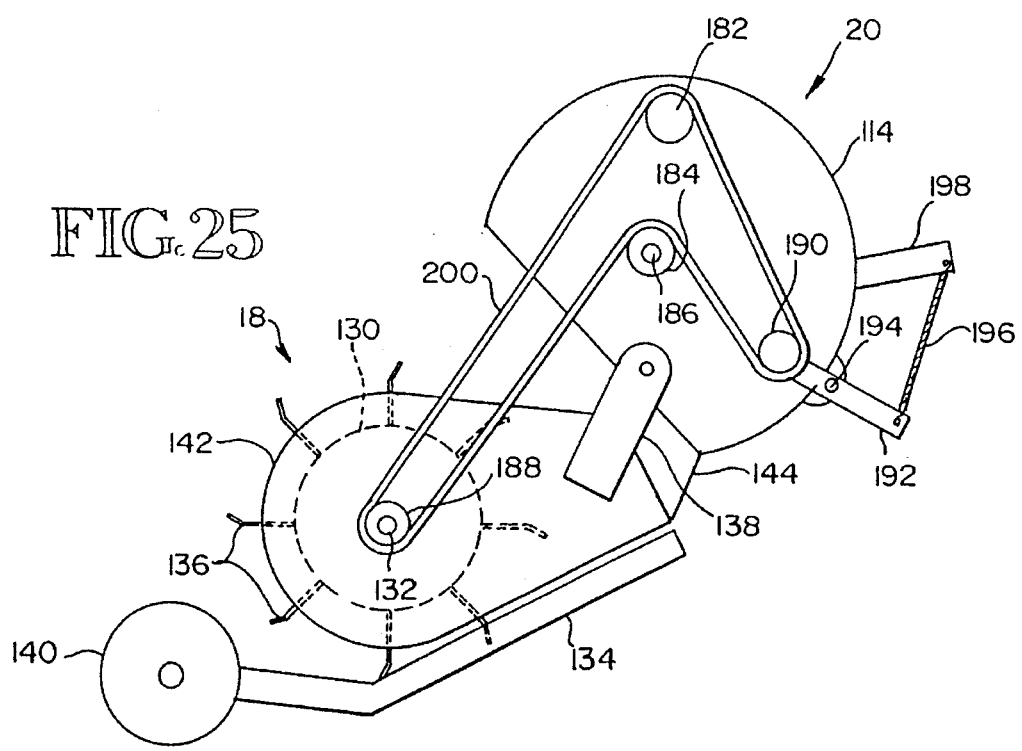
FIG. 25 is a side elevation view of the left side chain drive mechanism associated with the header assembly of the FIGS. 1–2 baler.

A header drive means is provided to operate the header augers 116, 117 and the pick up cylinder 134. As shown in FIGS. 24 and 25 in particular, this header drive means comprises a hydraulic motor 160 mounted on the right end of header housing 114. The shaft of motor 114 has a drive chain sprocket 162 mounted thereon to engage a drive chain 164. The right end of header auger 117 is provided with a drive shaft 166 that mounts a drive sprocket 168 also engaged with drive chain 164. The right end of pick up cylinder shaft 132 mounts a drive sprocket 170 that is engaged with drive chain 164. A right hand chain-tightening idler sprocket 172 is mounted by a spring-biased pivot arm 174 that is pivotally attached at 176 to header housing 114. Pivot arm 174 is biased by a coil spring 178 that is anchored to the housing by a bracket 180. Drive chain 164 is reeved around sprockets 162, 170 and 172 and is reeved over sprocket 168 as shown in FIG. 24. Idler sprocket 172 is spring biased to maintain tension in drive chain 164 as the relative distance between pick up carriage 134 fluctuates during operation of the machine over varying terrain. The foregoing-described drive mechanism is duplicated, excepting the hydraulic motor, on the left end of the left header auger 116 and the left end of pick up cylinder 130 as shown in FIG. 25. This left end mechanism comprises an idler sprocket 182 mounted to the left end of header housing 114, a drive sprocket 184 mounted to the left end of a drive shaft 186 extending from the left header auger 116, a drive sprocket 188 mounted to the left end of pick up cylinder shaft 132, and a spring-loaded idler sprocket 190 mounted on a pivot arm 192. Pivot arm 192 is pivotally-attached at 194 to the left end of header housing 114 and is spring biased to a chain-tightening position by a coil spring 196 that is anchored to the header housing 114 by a bracket 198. A left end drive chain 200 is reeved around sprocket 182, 132 and 190, and is reeved over sprocket 185.

This header drive means operates as follows when hydraulic motor 160 is turned on. Motor drives the right end drive chain 164 to rotate the right header auger 117 clockwise and the pick up cylinder 130 counter-clockwise as seen in FIG. 24. The rotation of pick up cylinder drives the left end drive chain 200 to rotate the left end auger 116 counter-clockwise as seen in FIG. 25. Hydraulic motor 160 would be connected by appropriate hydraulic hoses to the hydraulic pumping system of the pulling tractor in the customary manner. The flights of the header augers 116, 117 are appropriately oriented to convey the picked up material laterally toward the center of the header housing 114 for contact with the feeding auger 32.

Figure 2:
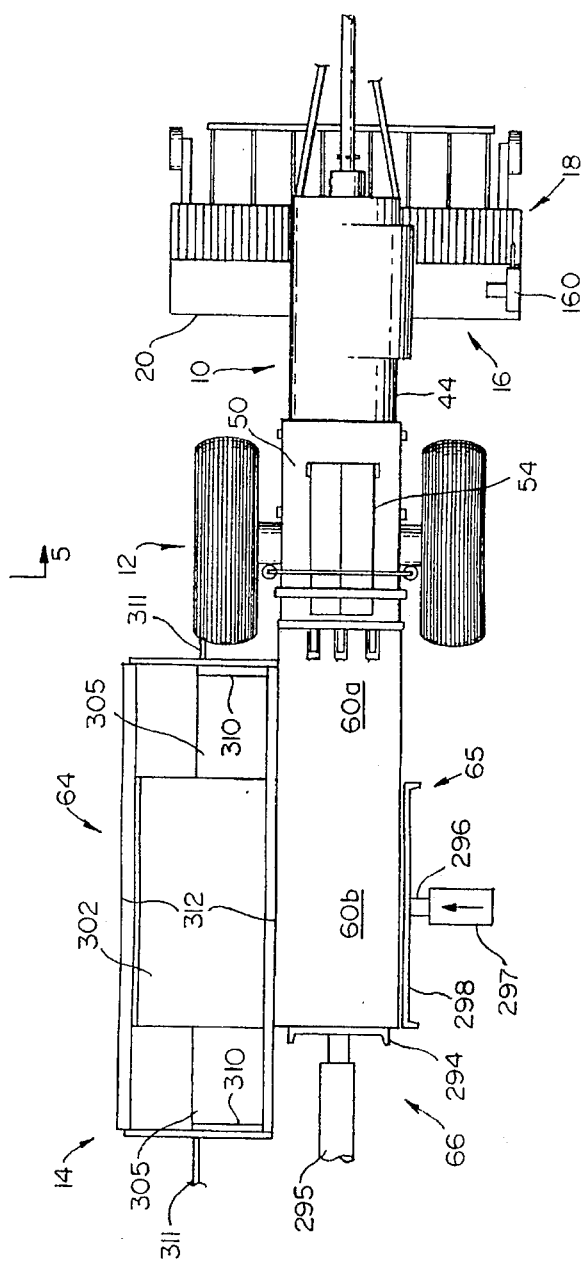
FIG. 2 is a simplified top plan view of the FIG. 1 baler.
Figure 5:
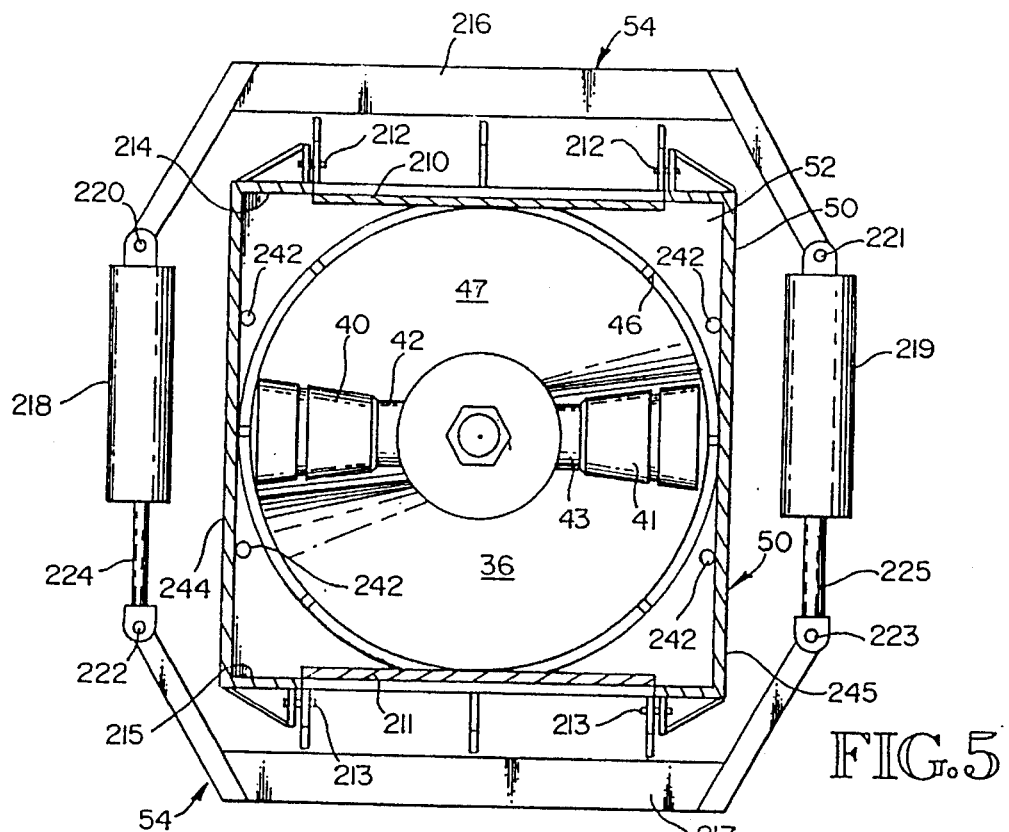
FIG. 5 is an elevation view in cross section taken along the line 5—5 of FIG. 1.
Figure 6:
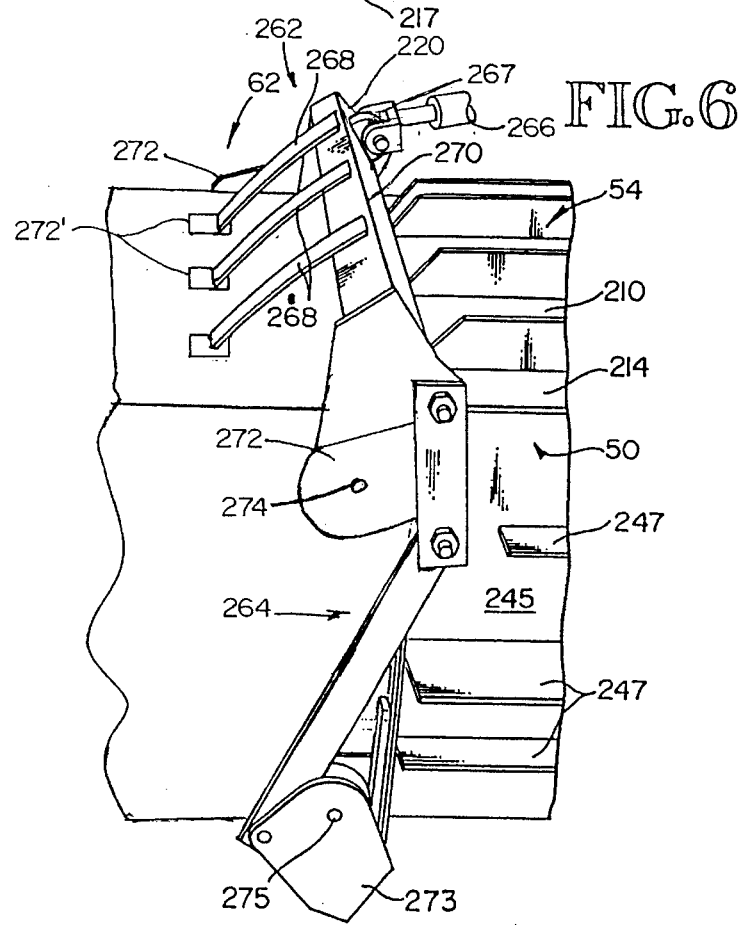
FIG. 6 is a partial side view of the FIGS. 1–2 baler in perspective illustrating the material-dividing mechanism of this invention in an inactivated position.

The means 54 for applying compressive force to a bulk material being formed in the bale forming compartment 50 is shown in FIGS. 2, 5 and 6. This means 54 comprises a pair of opposed, top and bottom reinforced panels 210, 211 that are pivotally mounted at 212, 213, respectively, to the forward ends of the top and bottom of walls 214, 215 of compartment 50. Compression panels 210, 211 are elongated and extend from near the forward end of compartment 50 to the rearward end thereof. The rearward ends of panels 210, 211 are respectively attached to upper and lower cross bars 216, 217 that are coupled together by left and right hydraulic cylinder 218, 219. The cylinder ends of the cylinders 218, 219 are respectively pivotally attached at 220, 221 to top cross bar 216 and the rod ends of cylinders 218, 219 are respectively attached at 222, 223 to bottom cross bar 217. Cylinders 218, 219 are appropriately coupled together by hydraulic hosing and by a tractor-mounted hydraulic control system such that the cylinder rods 224, 225 may be drawn into their respective cylinders to simultaneously pivot compressing panels 210, 211 into the interior of bale forming compartment 50. When compression panels 210, 211 extend into compartment 50, they provide a restriction to rearward movement of a bale being formed therein. Because the compression panels 210, 211 are elongated and pivoted from near the forward end of compartment 50, they provide an increasing resistance as the bulk material is translated rearwardly. The hydraulic system pressure serving cylinders 210, 211 may be adjusted to provide a predetermined degree of inward compression force that the rearwardly-moving bulk material must overcome as it is translated rearwardly. The pivoted forward ends of panels 210, 211 are spaced rearwardly from the forward end of compartment 50 such that there is sufficient space between the forward end of the panels and the compacting rollers 40, 41 for the cross-section of the bale to become established. Because of the high compression forces experienced in compartment 50, the side walls 244, 245 are reinforced with a plurality of elongated longitudinal ribs 247. These ribs 247 are themselves reinforced with multiple transverse bands 248. When the bulk material leaves the rearward ends of panels 210, 211, it is substantially compressed due to having been forced through the restricted area provided at the end of the panels. This compressed bulk material is translated rearwardly into the bale holding compartment 60. As it enters compartment 60, the compressed bulk material will substantially maintain its compressed state as a consequence of the force exerted by compressed bulk material still in compartment 50 and as a consequence of being forced against baled material within compartment 60.

Figure 7:
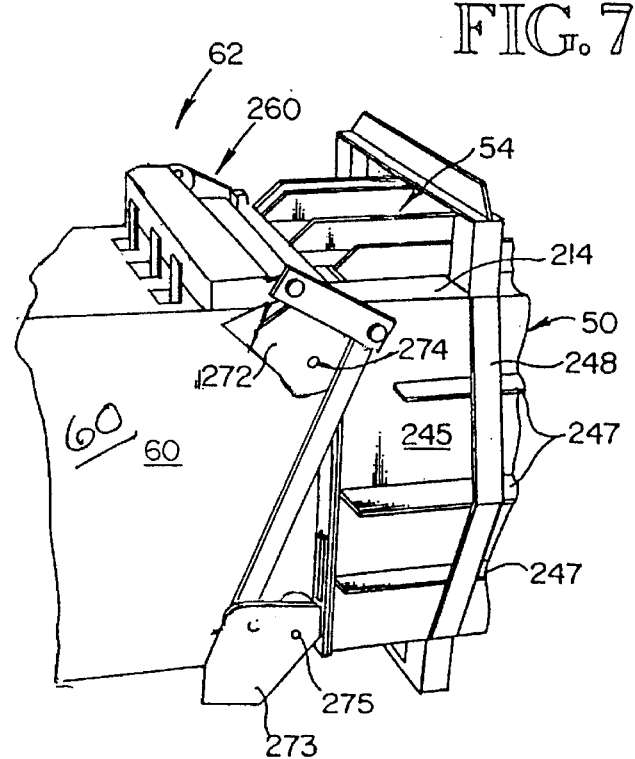
FIG. 7 is a partial side view of the FIGS. 1–2 baler in perspective illustrating the FIG. 6 material-dividing mechanism in an activated position.
Figure 8:
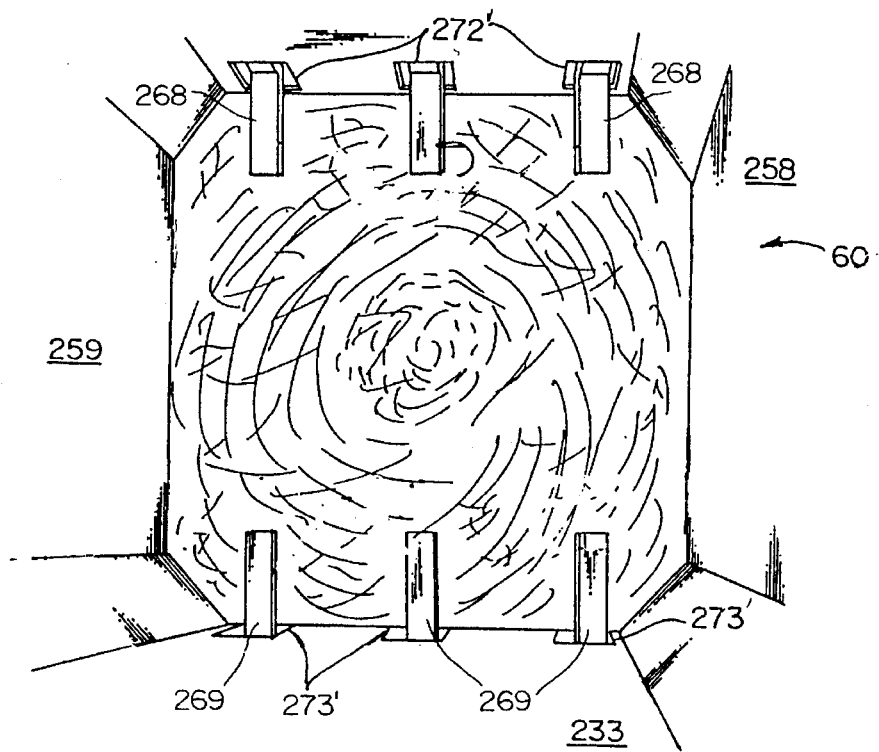
FIG. 8 is a partial view in perspective of the inside of the FIGS. 1–2 baler, illustrating the internal position of hay dividing members when the material-dividing mechanism of FIGS. 6–7 is activated.

As shown in FIGS. 6–8, material dividing means 62 comprises a restraining means 260 for blocking rearward translation of bulk material in compartment 50 into infeed section 60a. Restraining means 260 comprises top and bottom sets of a plurality of material-separating fingers 268, 269 that are mounted on top and bottom cross bars (top bar 270 being shown). The top and bottom cross bars are pivotally mounted by pairs of left and right mounting plates 272, 273, the pivot points 274, 275 being eccentric of the axis of the cross bars. When the top and bottom cross bars are rotated (with respect to FIG. 6: top cross bar counterclockwise; and bottom cross bar clockwise) to extend the dividing fingers 268, 269 into the compartment 60, the cross bars are translated rearwardly as they are rotated such that the fingers 268,2 69 are inserted into compartment 60 substantially vertically. Fingers 268, 269 extend substantially tangentially outward from their respective cross bars. When fingers 268, 269 are inserted into compartment 60, they extend through top and bottom apertures 272', 273' respectively in the top and bottom walls 232, 233 of compartment 60, engage the top and bottom portions of the rearwardly-moving bulk material within compartment 50, and stop rearward movement of that bulk material.

Levers and linkages, comprising linkage means 264, are provided on the left and right sides. These levers and linkages connect the mounting plates 272 and 273 to one another such that they pivot in unison about their respective pivot points. Actuating means 266 is preferably a hydraulic cylinder having its cylinder end pivotally mounted to compartment 50 and its rod end pivotally attached to an actuating lug 267. When the rod of cylinder 266 is extended, the dividing fingers are inserted into compartment 60. When the rod of cylinder 266 is retracted, the fingers are retracted from compartment 60. Appropriate timing means would interrelate the actuation of cylinder 266 with the operation of the bale transfer means 64 to properly sequence the bulk material separating and bale transferring processes.

When restraining means 260 are inactivated restraining means fingers 268, 269 will be returned to the position shown in FIG. 6. When fingers 268, 269 are withdrawn from compartment 60, the mass of bulk material 292 within compartment 50 will be free again to move rearwardly. Inasmuch as material will have been continuously added by auger feeding means 10 to the forward end of this mass of bulk material 292, thereby adding to the compression of the bulk material in compartment 50, the withdrawal of fingers 268, 269 will cause the rearward edge of bulk material 292 to spring rearwardly into contact with the resistance means 66; and the cycle will continue.

As bulk material from compartment 50 is translated rearwardly through the bale holding compartment 60, means 66 for applying compressive force to the bulk material within compartment 60 establishes a resistance to rearward bulk material travel. Means 66 comprises a spring-loaded plunger consisting of a pressure plate 294 have a peripheral dimension corresponding to the cross-sectional area of chamber 60, and a plunger guide rod 295 mounting the pressure plate to the rear of chamber 60. Pressure plate 294 is spring-loaded to be urged forward to the front of chamber section 60b to contact the forward edge of the compacted bulk material extending into section 60a. The compressive force of the spring-loading on plate 294 is sufficient to maintain the bulk material in an adequate state of compression as it is forced from chamber 50 into and through chamber 60.

When sufficient bulk material has been translated into the holding section 60b of bale transfer compartment 60, the bale transfer means 65 is actuated to transfer the compacted, discrete bale of bulk material into the bale wrapping means 64. In the wrapping operation, bulk material dividing means 62 are actuated. Dividing means 62 separates the bulk material so that transfer means 65 can function without interference from bulk material within compartment 50. Bale transfer means 65 comprises a hydraulic ram 296 having a hydraulic cylinder 297, mounted to the frame adjacent one of the sidewalls of chamber 60, and a reinforced pressure platen 298 that constitute a portion of one of the sidewalls 258 of section 60b of chamber 60. The opposing side wall 259 is essentially comprised of a peripheral framework to which the wrapping means 64 is connected so that the full length of the interior of chamber section 60b is exposed to the wrapping means 64. While bulk material is being translated into chamber 60b, the bulk material is adequately supported by the floor 233 of that chamber, along with the side wall platen 298 and the rest of sidewall 298 and pressure plate 294. Consequently, the full length opening to the wrapping means 64 does not pose any bale-forming stability problems that might tend to cause the compacted—but as yet unbound—bale to buckle.

When the bulk material within section 60b is to be wrapped into a finished bale, dividing means 62 creates a gap between the forward end of the material within compartment 60b and the rearward end of the material still within compartment 50. This leaves a complete bale—as yet unbound—within chamber section 60b. Then bale transfer means 65 is actuated to push the bale laterally into the wrapping means 64. As seen in FIGS. 12–16, a discrete bale 300 is pushed from the chamber 60b into a wrapping box 302 (FIGS. 12–13) and the bale transfer means 65 is retracted. Wrapping box 302 has an outer wall 302a, a top wall 302b, two end walls 302c, and a bottom wall 302d that serves as a wrapping platform. The inner side of the wrapping box that faces the bale transfer compartment 60 is completely open. Upon retraction of the bale transfer means 65, compressive force applying means 66 extends back into chamber 60b to engage the face of another bale-in-formation within section 60a. Dividing means 62 is inactivated and additional bulk material is translated into section 60b for repetition of the bale wrapping process. Wrapping box 302 is provided with interior dimensions that correspond to the size of the bale 300 that is transferred from holding section 60b. Therefore, the transfer of discrete bales into the wrapping box 302 will maintain the bale in its compressed form, the wrapping box end walls 302c preventing the bale from expanding.

Figure 13:
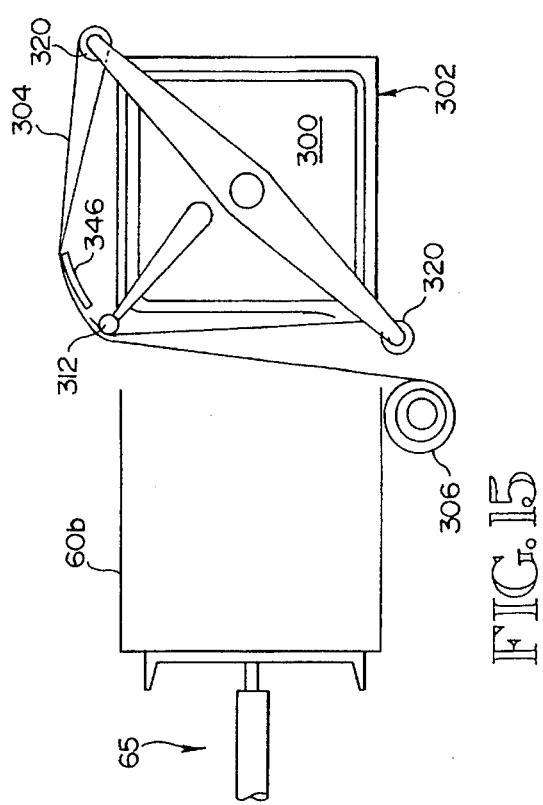
Figure 14:
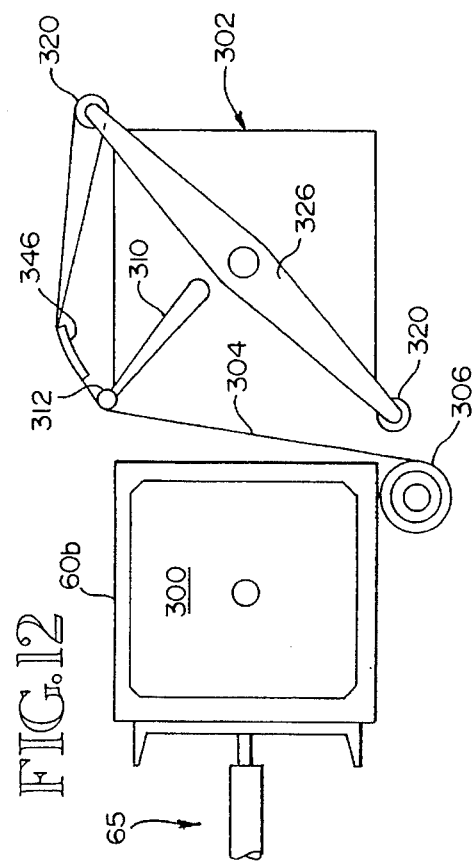

When a bale 300 is pushed onto the wrapping platform 302d, the bale engages the face of a sheet of plastic wrapping film 304 and carries that film into the wrapping box 302 so that the top, bottom and outer side of the bale 300 are covered by the film 304 as shown in FIG. 13. The film 304 is drawn from a supply roll 306 that is appropriately mounted to the frame adjacent to chamber 60b for that purpose. The free end of the film 304 is held above the wrapping box 302 by a film severing and clamp means 308 (see FIGS. 9–11) sufficiently tightly that a sufficient length of film can be drawn off the roll 306 to cover the top, bottom and outer side of bale 300 by movement of the bale across the platform 302d. After the bale 300 has been shifted onto the wrapping platform 302d, and the top, bottom and sides of the bale covered with film (as shown in FIG. 13), the free end of the film is released by film severing and clamp means 308. Then, a roller frame 310, carrying an elongated roller 312, rotates downward to fold the free end of the film down against the inner side of bale 300 as shown in FIGS. 11 and 14 across the open side of the wrapping box 302. Roller frame 310 is pivotally mounted at the forward and rearward ends of the wrapping means 64 by a shaft 311 (the rearward end thereof being shown in FIG. 9). Shaft 311 is supported by suitable end supports 314. Roller 312 extends parallel to the longitudinal axis of the bale 300 and is rotatably mounted to the frame 310. After folding the free film end down onto the inner side of bale 300, roller 312 is repositioned back to its original position as shown in FIGS. 10 and 15.

Then one of a pair of film-engaging rollers 320 is rotated into engagement with the film at a location between the supply roll 306 and the bottom inner edge of wrapping box 302 and rotated (clockwise in FIGS. 14–15) to bring the film around the inner side of the bale and up against the folded-down free end of the film (FIGS. 14–15) to the position shown in FIG. 10. When the film-engaging one of the rollers 320 reaches the position shown in FIG. 10, adjacent the upper inner edge of bale 300, the film is engaged by the film severing and clamp means 308 to cut the film and to hold the new free end of the film at the just-cut edge. The film around the bale 300, having been cut free at 322 (see FIG. 10), is then engaged by bale end tucking means 330, one at each end of the bale, to engage the end portions of the wrapped film that extend beyond the bale ends and to tuck them into the center of the bale ends to produce the finished bale illustrated in FIG. 18. The finished, wrapped bale 300 is then discharged from the wrapping means 64 through trap doors 324 in the wrapping platform 302d.

Figure 15:
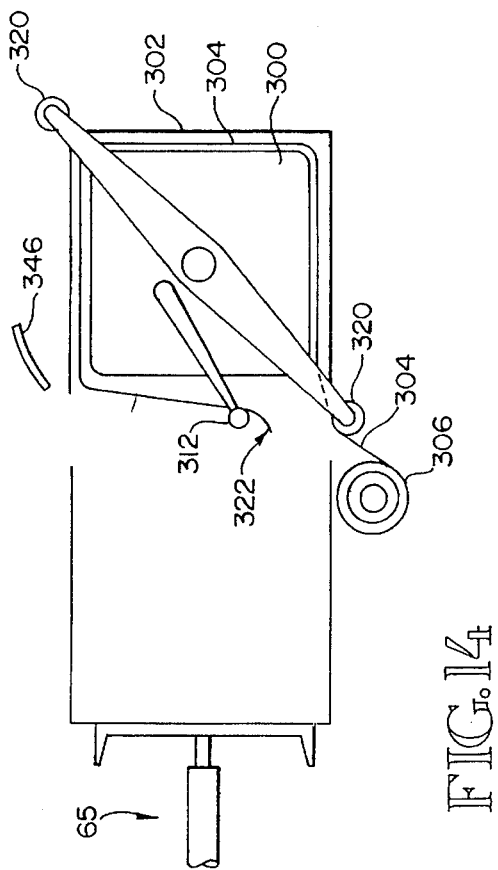

The film-engaging roller 320, after the film around the bale is severed at 322 (FIG. 10) to free the wrapped while yet still clamping the free film end, continues to rotate to a position adjacent the upper outer edge of bale 300 as shown in FIG. 15 in preparation for the next bale wrapping operation. When the next bale is pushed onto the wrapping platform 302d, the film is engaged, as described above, the film severing and clamp means 308 releases the free end of the film 322, and the film is drawn around the top, bottom and outer side of the new bale by movement of the bale into the wrapping box 302. When the film-engaging roller 320 reaches the position shown in FIG. 15, the film extends from the film severing and clamp means 308, out around the roller 320 and back toward and around the roller 312. Consequently, the film across the top of the bale 300 was overlapped on itself as shown in FIG. 15 to provide a double width of the material on the top side. Consequently, when the next bale is pushed onto the wrapping platform 302d, the double width of material yields a sufficient length of material to cover the top of the new bale and to provide a free end portion 322 that can be folded down onto the inner side of the new bale.

Figure 9:
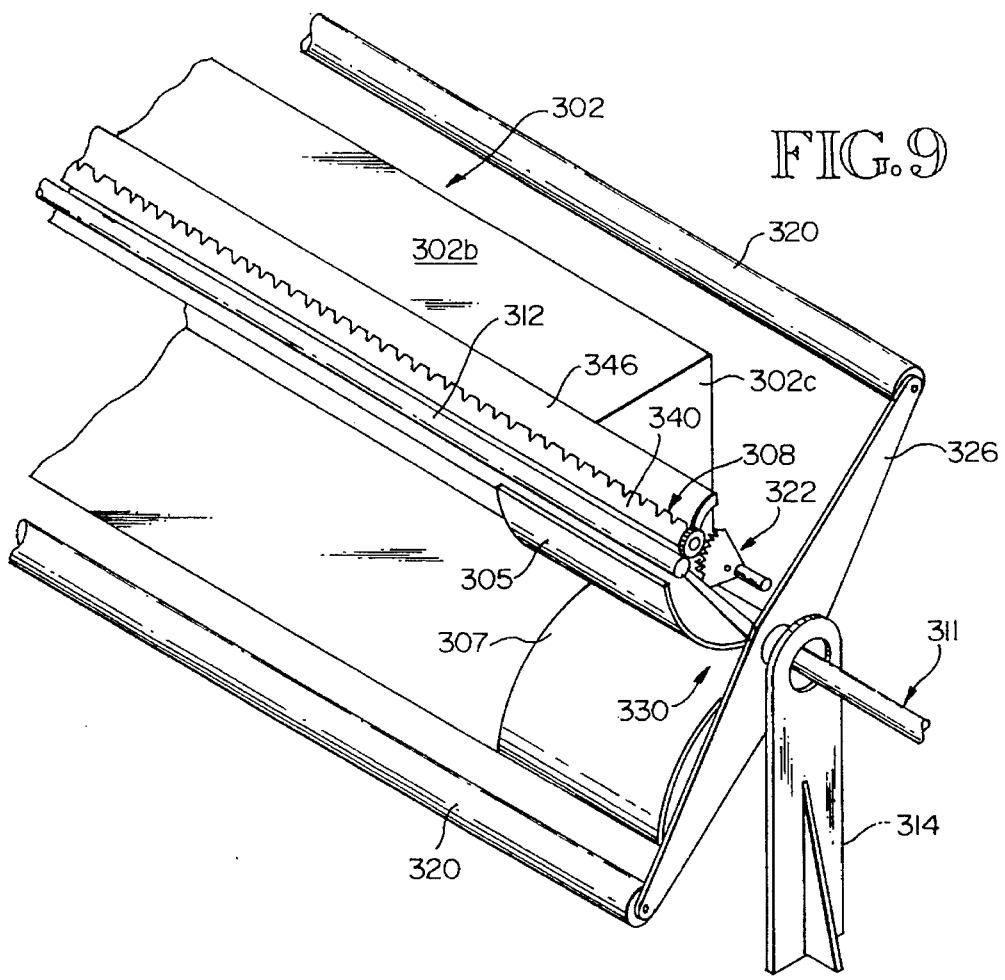
FIG. 9 is a partial view in perspective of the rear end of the FIGS. 1–2 baler illustrating bale-wrapping means for wrapping baled material in a sheet of plastic film.

The pair of rollers 320 are mounted at opposite ends of a pair of swing arm members 326 that are rotatably mounted to shaft 311 as shown in FIG. 9. Swing arm members 326 are appropriately driven to rotate to accomplish the functions described above by suitable drive means that are not illustrated. Such a suitable drive means may be a hydraulic motor carried by the support 314. With each 180° rotation of the swing arm members 326, a roller 320 is rotated into position for wrapping a new bale, the position shown in FIG. 13. A single roll 320 could be employed but the roller pair illustrated balances the system and makes for a more efficient operation.

Film severing and clamp means 308 comprises a cutter clamp bar 340 that extends the full width of the film sheet and is provided with curved cutter teeth along its upper edge. The bar 340 is rotatably mounted on a shaft that mounts a spur gear 342. spur gear 342 is meshed with a segment gear 344. When segment gear 344 is rotated from the position shown in FIG. 11 to that shown in FIG. 10, spur gear 342 is rotated clockwise to cause bar 340 to first rotate to pierce and sever the film portion that is wrapped up across the inner side of the bale 300 and then to rotate around to clamp the free cut end 322 of the film down onto a curved resilient pad 346. The free cut end 322 is held clamped onto pad 346 until segment gear 344 is rotated counterclockwise to cause bar 340 to rotate back out of contact with pad 346. By appropriate levers and other mechanisms, the rotation of segment gear 344 us coupled with the rotations of rollers 312 and 320 so that bar 340 is shifted to the position shown in FIG. 11 as the roller 312 is swung down from the position shown in FIG. 12 to the position of FIG. 13; and is shifted to the position shown in FIG. 10 as the roller 312 and 320 are swung from the position shown in FIG. 14 to the position of FIG. 15. Segment gear 344 could be spring-loaded so that, as the rollers 312 and 320 approach the positions shown in FIG. 10 (which is midway between the positions shown in FIGS. 14 and 15), segment gear 344 would snap from the FIG. 11 position to the FIG. 10 position, thereby causing the bar 340 to rapidly snap from the "cocked" position of FIG. 11 to the cutting position of FIG. 10 so as to sever the film and clamp the free end 322 all in one rapid movement. This severing and clamping action is sufficiently rapid that the severed free end 322 does not have time to pull away from pad 346 before bar 340 clamps the film to the pad. The arrangement and locations of the elements of means 308 is such that, at the position shown in FIG. 11, bar 340 can rotate into severing and cutting without contacting the film 304 as it extends across the inner edges of rollers 312 and 320; a sufficient gap "G" being provided so that the rotation of bar 340 will only cause bar 340 to swing into contact with the film as it extends from roller 312 to the outer edge of roller 320.

Figure 9A:
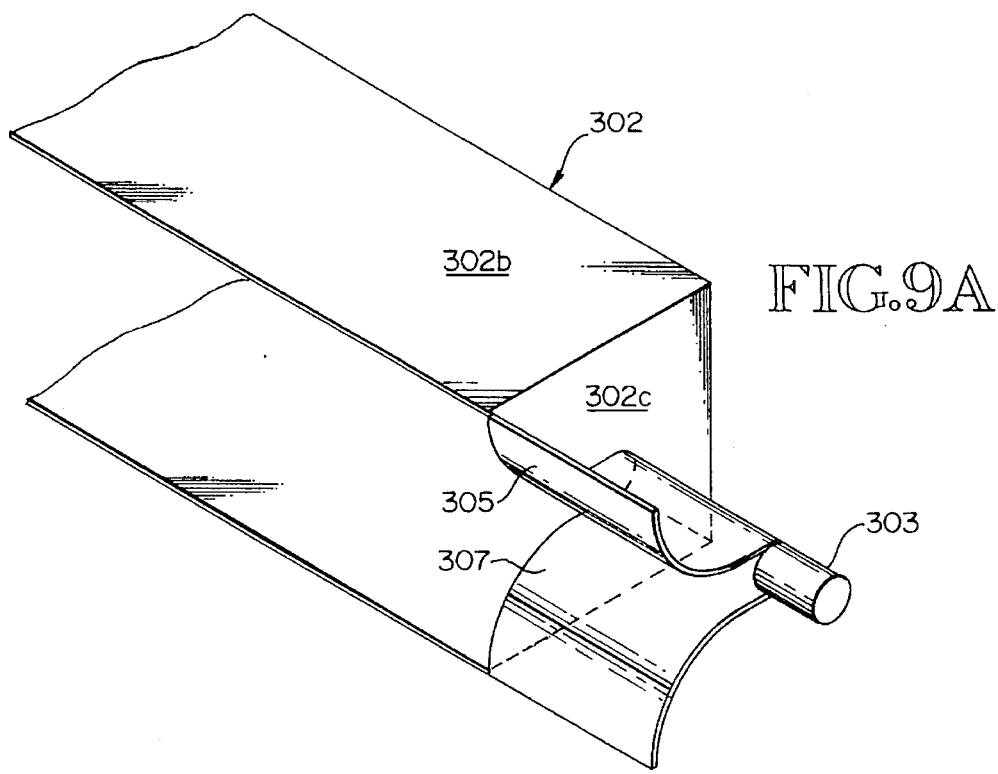
FIG. 9A is partial view of the FIG. 9 structure illustrating the bale wrapping box with end plastic film guides.
Figure 12:
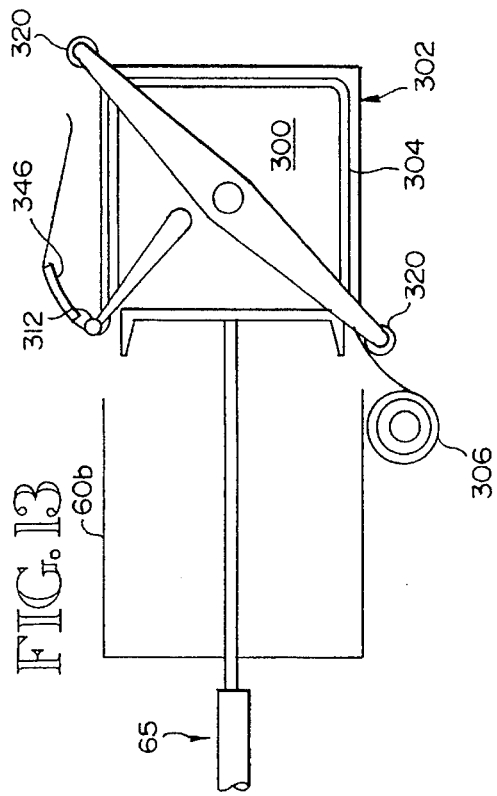

As shown in FIGS. 9 and 9A, wrapper box 302 is longitudinally and axially mounted from the same supports 314 as the rotation arms 326 so that the rollers 320 can circumvent the box during the course of the wrapping operation depicted in FIGS. 12–15. A main bearing shaft 303 is supported by supports 314 for that purpose. Roller arms 326 are rotatably mounted on shaft 303 by a bearing. The end walls 302c of wrapping box 302 are provided with convex guides 3–5, 307 to provide a narrowing guideway for the passage of the film 304 into and around the bale 300 as it is transferred into wrapping box 302.

When a discrete bale is transferred to the wrapping platform 302d, it leaves the confines of bale holding section 60b and is not longer subject to longitudinal compacting forces. Consequently, the bale will tend to expand slightly in a longitudinal direction. However, because the baled material is likely to have a relatively high moisture content, it is not likely to expand significantly. Moreover, because of the manner in which bulk material is added to the front of the mass of bulk material by the auger 47 and rollers 40, 41 and compressed thereby, the bulk material in its compacted form does not retain in a significant degree of springiness by the time that it reaches the holding section 60b. The pressure platen 298 that transfers a discrete bale to the wrapping platform 302d is as wide as the bale is long and, therefore, there is no tendency for a bale being transferred to break apart into wafers or segments during the transfer operation. Therefore, the discrete bale arrives on the wrapping platform 302d pretty much in the same compacted condition that existed within the holding section 60b.

While the preferred embodiment of the invention has been described herein, variations in the design may be made. For example, the principles illustrated in the foregoing description and the drawings could be applied to a stationary baling machine. In a stationary baling machine according to the present invention, the machine may be towable or it may be statically-mounted. The embodiment illustrated is designed for towing by a farm tractor. The invention could be stationary or it could be self-propelled.

The scope of the invention, therefore, is only to be limited by the claims appended hereto.

The embodiments of the invention in which an exclusive property is claimed are defined as follows:

We claim:

1. Apparatus for forming fibrous bulk material or the like into bales which comprises bale forming means for forming said material into an elongated continuous mass and bale wrapping means for receiving said mass of material from a discharge end of said bale-forming compartment and wrapping said mass into discrete bales;

said bale forming means comprising a bale-forming compartment with an infeed end and a discharge end, and material flow restricting means located between the infeed and discharge ends for resisting the movement of said mass of material; auger feeding means oriented longitudinally in line with said bale-forming compartment for conveying said material into the infeed end of said bale-forming compartment; and compacting roller means oriented transverse to said bale-forming compartment and so constructed and arranged with respect to said auger feeding means and the infeed end of said bale-forming compartment so that material is conveyed through said compacting roller means into said bale-forming compartment and distributed arcuately against the adjacent end of said mass of material, said compacting roller means and said material flow restricting means cooperatively functioning to create said mass of material in a compacted condition with material being added to said mass of material at the bale-forming compartment infeed end and compressed thereinto by said compacting roller means;

said bale wrapping means comprising a bale transfer compartment oriented in line with said bale-forming compartment and in communication with said bale-forming compartment discharge end for receiving said compacted mass of material, and material flow resisting means for resisting the movement of said mass of material from said bale-forming compartment into said bale transfer compartment so as to maintain the mass of material in said bale transfer compartment in a state of compaction; plastic film wrap-applying means for wrapping discrete bales in a sheet of plastic film; and bale transfer means for transferring discrete bales from said bale transfer compartment into said wrap-applying means.

2. The apparatus of claim 1 wherein said auger feeding means comprises a longitudinal auger shaft having an infeed end and a discharge end, at least one conveyor flight mounted by said shaft between the shaft infeed and discharge ends; and wherein said compacting roller means is mounted by said auger shaft at the shaft discharge end and is so constructed and arranged with respect to said conveyor flight whereby material conveyed by said auger feeding means will pass from said conveyor flight and through said compacting roller means into said bale-forming compartment for distribution and compaction against the mass of material at the bale-forming compartment infeed end.

3. The apparatus of claim 2 wherein said compacting roller means comprises at least one roller mounted to said auger shaft and constructed and arranged to rotate on an axis extending radially outward from said auger shaft whereby said roller will contact and roll against material as it is conveyed into said bale-forming compartment and added to said mass of material.

4. The apparatus of claim 1 wherein said bale transfer compartment comprises an infeed section and a bale holding section; and wherein said material flow resisting means comprises material dividing means communicating with said bale transfer compartment infeed section for separating the compacted mass of material received from said bale-forming compartment into a unit to be wrapped.

5. The apparatus of claim 4 wherein said material dividing means comprises restraining means for temporarily stopping movement of said compacted mass of material into the bale transfer compartment infeed section while said transfer means is engaged in transferring a discrete bale to said wrap-applying means.

6. The apparatus of claim 1 wherein said wrap-applying means comprises a wrapping platform means for receiving a discrete bale from said bale holding section and for discharging a wrapped bale from said wrap-applying means; supply means supplying wrapping film in sheet form; means for causing a bale to be wrapped with plastic film from said supply means; severing means for severing the supply means film from the film wrapped around a wrapped bale; and clamping means and for holding the severed film in position for wrapping around another bale transferred to said wrapping platform means after the wrapped bale has been discharged.

7. The apparatus of claim 1 including material charging means for feeding said material into said auger feeding means.

8. The apparatus of claim 7 wherein said material charging means comprises pick up means for picking up fibrous bulk material from a field over which said apparatus is transported; and header means from conveying material from said pick up means into said auger feeding means.

9. The apparatus of claim 8 wherein said pick up means comprises an elongated rotary material pick up cylinder means extended transversely across the front of said apparatus; and wherein said header means comprises left and right material conveying augers mounted transversely behind said pick up cylinder means for conveying material picked up by said pick up cylinder means laterally inward to said auger feeding means; and drive means for said charging means for rotating said pick up cylinder means and said left and right material conveying augers.

10. The apparatus of claim 9 wherein said header means includes a transverse auger housing mounted to said auger feeding means and extended laterally outward to both sides of said apparatus; said left and right material conveying augers being rotatably mounted by said transverse auger housing such that said material conveying augers are rotatably driven from their outer ends; and wherein said drive means is so constructed and arranged and coupled to said left and right material conveying augers and to said pick up cylinder means whereby said drive means rotates one of said material conveying augers, said driven material conveying auger drives said pick up cylinder means, and said driven pick up cylinder means drives the other material conveying auger.

11. Apparatus for forming fibrous bulk material or the like into bales which comprises bale forming means for forming said material into an elongated continuous mass and bale wrapping means for receiving said mass of material from a discharge end of said bale-forming compartment and wrapping said mass into discrete bales;

said bale forming means comprising a bale-forming compartment with an infeed end and a discharge end, and material flow restricting means located between the infeed and discharge ends for resisting the movement of said mass of material; auger feeding means oriented longitudinally in line with said bale-forming compartment for conveying said material into the infeed end of said bale-forming compartment; and compacting roller means oriented transverse to said bale-forming compartment and so constructed and arranged with respect to said auger feeding means and the infeed end of said bale-forming compartment so that material is conveyed through said compacting roller means into said bale-forming compartment and distributed arcuately against the adjacent end of said mass of material, said compacting roller means and said material flow restricting means cooperatively functioning to create said mass of material in a compacted condition with material being added to said mass of material at the bale-forming compartment infeed end and compressed thereinto by said compacting roller means;

said auger feeding means comprising a longitudinal auger shaft having an infeed end and a discharge end, at least one conveyor flight mounted by said shaft between the shaft infeed and discharge ends; and said compacting roller means being mounted by said auger shaft at the shaft discharge end and is so constructed and arranged with respect to said conveyor flight whereby material conveyed by said auger feeding means will pass from said conveyor flight and through said compacting roller means into said bale-forming compartment for distribution and compaction against the mass of material at the bale-forming compartment infeed end; said compacting roller means comprising at least one roller mounted to said auger shaft and constructed and arranged to rotate on an axis extending radially outward from said auger shaft whereby said roller will contact and roll against material as it is conveyed into said bale-forming compartment and added to said mass of material;

said bale wrapping means comprising a bale transfer compartment oriented in line with said bale-forming compartment and in communication with said bale-forming compartment discharge end for receiving said compacted mass of material, and material flow resisting means for resisting the movement of said mass of material from said bale-forming compartment into said bale transfer compartment so as to maintain the mass of material in said bale transfer compartment in a state of compaction; plastic film wrap-applying means for wrapping discrete bales in a sheet of plastic film; and bale transfer means for transferring discrete bales from said bale transfer compartment into said wrap-applying means; said bale transfer compartment comprising an infeed section and a bale holding section; and said material flow resisting means comprising material dividing means communicating with said bale transfer compartment infeed section for separating the compacted mass of material received from said bale-forming compartment into a unit to be wrapped.

12. The apparatus of claim 11 wherein said wrap-applying means comprises a wrapping platform means for receiving a discrete bale from said bale holding section and for discharging a wrapped bale from said wrap-applying means; supply means supplying wrapping film in sheet form; means for causing a bale to be wrapped with plastic film from said supply means; severing means for severing the supply means film from the film wrapped around a wrapped bale; and clamping means for holding the severed film in position for wrapping around another bale transferred to said wrapping platform means after the wrapped bale has been discharged.

13. The apparatus of claim 12 including material charging means for feeding said material into said auger feeding means.

14. The apparatus of claim 13 wherein said material charging means comprises pick up means for picking up fibrous bulk material from a field over which said apparatus is transported; and header means from conveying material from said pick up means into said auger feeding means.

15. The apparatus of claim 14 wherein said pick up means comprises an elongated rotary material pick up cylinder means extended transversely across the front of said apparatus; and wherein said header means comprises left and right material conveying augers mounted transversely behind said pick up cylinder means for conveying material picked up by said pick up cylinder means laterally inward to said auger feeding means; and drive means for said charging means for rotating said pick up cylinder means and said left and right material conveying augers.

16. The apparatus of claim 15 wherein said header means includes a transverse auger housing mounted to said auger feeding means and extended laterally outward to both sides of said apparatus; said left and right material conveying augers being rotatably mounted by said transverse auger housing such that said material conveying augers are rotatably driven from their outer ends; and wherein said drive means is so constructed and arranged and coupled to said left and right material conveying augers and to said pick up cylinder means whereby said drive means rotates one of said material conveying augers, said driven material conveying auger drives said pick up cylinder means, and said driven pick up cylinder means drives the other material conveying auger.

17. The apparatus of claim 11 including material charging means for feeding said material into said auger feeding means.

18. The apparatus of claim 17 wherein said material charging means comprises pick up means for picking up fibrous bulk material from a field over which said apparatus is transported; and header means from conveying material from said pick up means into said auger feeding means.

19. The apparatus of claim 18 wherein said pick up means comprises an elongated rotary material pick up cylinder means extended transversely across the front of said apparatus; and wherein said header means comprises left and right material conveying augers mounted transversely behind said pick up cylinder means for conveying material picked up by said pick up cylinder means laterally inward to said auger feeding means; and drive means for said charging means for rotating said pick up cylinder means and said left and right material conveying augers.

20. The apparatus of claim 19 wherein said header means includes a transverse auger housing mounted to said auger feeding means and extended laterally outward to both sides of said apparatus; said left and right material conveying augers being rotatably mounted by said transverse auger housing such that said material conveying augers are rotatably driven from their outer ends; and wherein said drive means is so constructed and arranged and coupled to said left and right material conveying augers and to said pick up cylinder means whereby said drive means rotates one of said material conveying augers, said driven material conveying auger drives said pick up cylinder means, and said driven pick up cylinder means drives the other material conveying auger.

* * * * *